Patented Sept. 17, 1940

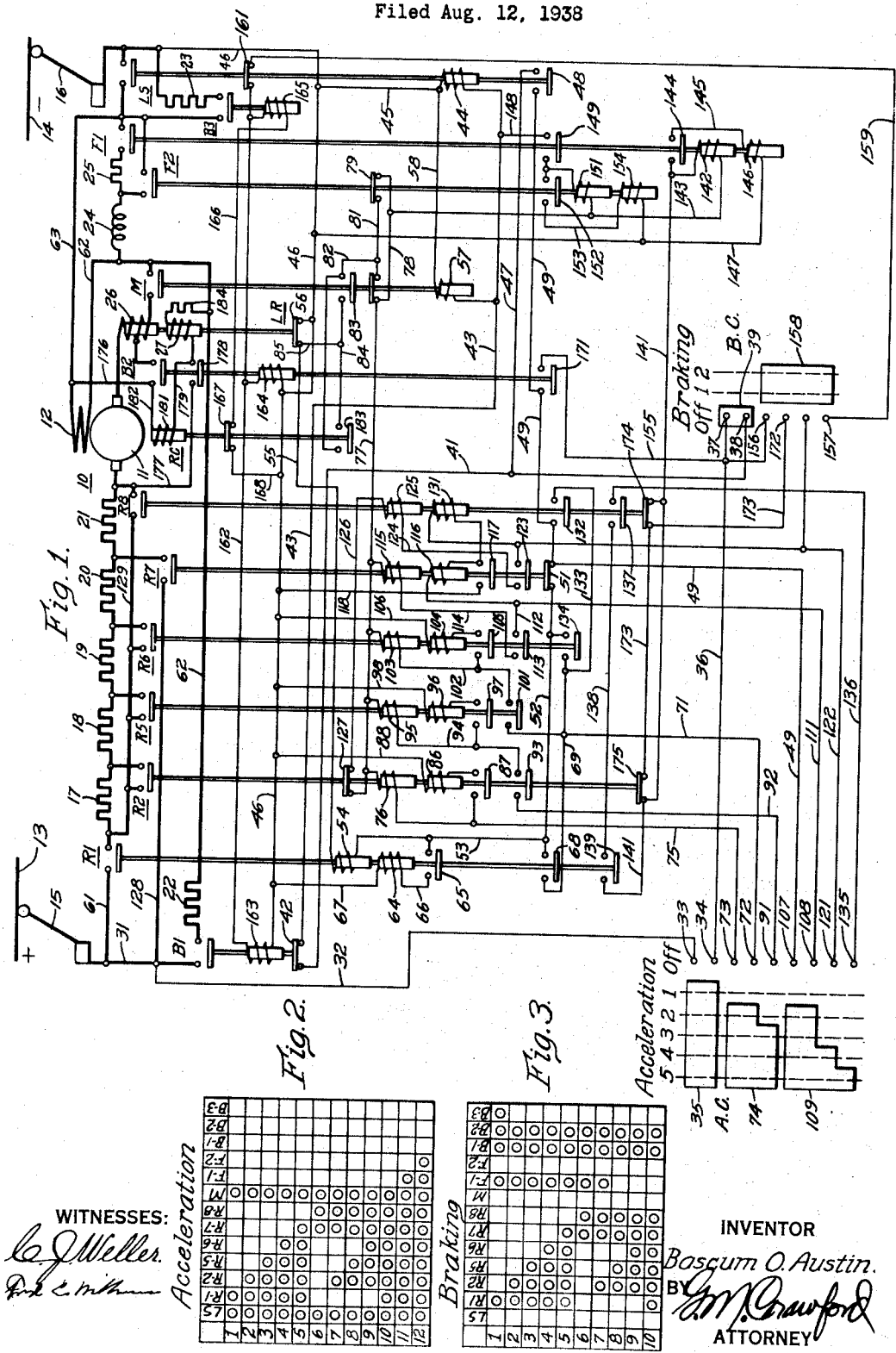

2,215,314

UNITED STATES PATENT OFFICE 2,215,314

MOTOR CONTROL SYSTEM

Bascum O. Austin, Wilkinsburg, Pa., assignor to Westinghouse Electric & Manufacturing Company, East Pittsburgh, Pa., a corporation of Pennsylvania Application August 12, 1938, Serial No. 224,559

15 Claims. (Cl. 172—179)

My invention relates, generally, to motor control systems and, more particularly, to systems for controlling the operation of the propelling motors of electric vehicles, as, for example, street cars and trolley buses.

An object of my invention, generally stated, is to provide a motor control system which shall be simple and efficient in operation and which may be economically manufactured and installed.

A more specific object of my invention is to provide dynamic braking connections for the propelling motor of an electric vehicle with a relatively small number of switches and without the use of a reverser for this purpose.

Another object of my invention is to provide over-voltage protection for the motor during dynamic braking at high speeds of the vehicle.

A further object of my invention is to provide for dual operation of the braking and accelerating controllers during the braking period.

Still another object of my invention is to provide for separately exciting the field winding of the motor during dynamic braking until a predetermined voltage is generated.

A still further object of my invention is to prevent the progression of an automatic control system during dynamic braking of the motor until a predetermined voltage is generated.

Other objects of my invention will be explained fully hereinafter or will be apparent to those skilled in the art.

In accordance with one embodiment of my invention, the accelerating and the braking controllers are so connected in the motor control system that the acceleration is controlled by operating one controller and dynamic braking is controlled by operating both controllers. Over-voltage protection for the motor during dynamic braking is provided by a limit relay having a coil responsive to the motor voltage. A relay which is also responsive to the motor voltage during braking is utilized to control the field flashing and to prevent the progression of the automatic control equipment until a predetermined voltage is attained.

For a fuller understanding of the nature and objects of the invention, reference may be had to the following detailed description taken in conjunction with the accompanying drawing, in which:

Figure 1 is a diagrammatic view of a motor control system embodying my invention, Fig. 2 is a chart showing the sequence of operation of a portion of the equipment during acceleration of the motor, and Fig. 3 is a similar chart showing the sequence of operation during the dynamic braking period.

Referring now to the drawing, the system shown therein comprises a motor 10 which may be of a type suitable for propelling an electric vehicle (not shown). The motor 10, as shown, is of the series type having an armature winding 11 and a series field winding 12. Electrically operated switches LS and M are provided for connecting the motor 10 to a source of electric power which is supplied to the motor through power conductors 13 and 14 and current collecting devices 15 and 16, disposed to engage the power conductors 13 and 14, respectively. A plurality of resistors 17 to 21, inclusive, are provided for controlling the motor current during both the acceleration and dynamic braking periods of operation. A plurality of switches R1, R2, R5, R6, R7 and R8 are provided for shunting the resistors from the motor circuit in sequential relation, as will be more fully described hereinafter.

In addition to the foregoing resistors, a resistor 22 is connected in the armature circuit for the motor during dynamic braking and a resistor 23 is connected in the field circuit during a portion of the dynamic braking period. The dynamic braking circuit for the motor is established by switches B1, B2 and B3, as will be more fully described hereinafter. In addition to the foregoing switches, field shunting switches F1 and F2 are provided for shunting the field winding 12 of the motor through a reactor 24 and a resistor 25 during certain portions of the operating cycle.

The operation of the foregoing switches is controlled during the accelerating period by an accelerating controller AC and during the braking period by the accelerating controller AC in cooperation with a braking controller BC. The foregoing controllers are so interlocked that it is necessary for the braking controller to be in the "off" position before power can be applied to the motor 10 to operate the vehicle. In order to apply dynamic braking to the motor, it is necessary to operate both the braking and the accelerating controllers, both of which may be connected to a common operating means, if desired.

In order that the acceleration and also the dynamic braking of the vehicle may be automatically controlled, as well as manually by means of the controllers AC and BC, a current limit relay LR is provided for automatically controlling the operation of the resistor shunting switches previously mentioned. The relay LR is provided with a current coil 26 and a potential coil 27. During the accelerating period, the entire current coil 26 is connected in the armature circuit for the motor and the potential coil 27 is disconnected. Therefore, the relay is responsive only to the motor current and functions in the usual manner to control the operation of the accelerating switches.

However, during the braking period, the current coil 26 is so connected in the armature circuit by means of the switch B2 that a portion of the coil is made ineffective during dynamic braking. The potential coil 27 is connected across the motor by means of an interlock on the switch B2, thereby making the relay LR responsive to the voltage generated by the motor and causing the relay to function to limit the motor voltage by so controlling the operation of the resistor shunting switches that the motor current and, consequently, the motor voltage are prevented from becoming excessive during dynamic braking.

In order to insure that the voltage of the motor 10 will build up quickly when the dynamic braking connections are established, the field winding 12 of the motor is connected to the power conductors 13 and 14 when the dynamic braking connections are first established, thereby exciting the field winding 12 to build up the motor voltage in the proper manner.

However, it is undesirable to leave the field winding 12 connected across the power conductors after the motor voltage has attained a predetermined value and a relay RC, which is responsive to the motor voltage, is provided for so controlling the operation of the switch B3 that the field winding 12 is disconnected from the power conductors when a predetermined voltage is generated. The relay RC is also utilized to prevent the sequential operation of the resistor shunting switches until a predetermined voltage is generated by the motor during dynamic braking, thereby insuring that the proper amount of resistance will be connected in the motor circuit when the motor voltage builds up and the dynamic braking current starts to circulate. The actuating coil of the relay RC is connected across the armature of the motor by an interlock on the switch B2 only during dynamic braking, and this relay does not function during the accelerating period.

In order that the functioning of the foregoing apparatus may be more clearly understood, the operation of the system will now be described in more detail. As explained hereinbefore, the acceleration of the vehicle may be manually controlled by operating the controller AC through positions 1 to 5 in a step-by-step manner or the vehicle may be accelerated automatically under the control of the limit relay LR by actuating the controller to position 5 immediately upon the starting of the vehicle.

Assuming that the controller AC is actuated to position 5, the switches LS, R1 and M are closed, as indicated in the sequence chart shown in Fig. 2, to connect the motor to the power conductors. The energizing circuit for the actuating coil of the switch LS may be traced from the positive conductor 13 through the current collector 15, conductors 31 and 32, contact fingers 33 and 34 bridged by a segment 35 on the controller AC, conductor 36, contact fingers 37 and 38 bridged by segment 39 on the controller BC, conductor 41, an interlock 42 on the switch B1, conductor 43, the actuating coil 44 of the switch LS, conductors 45 and 46, and the current collecting device 16 to the negative conductor 14. The energizing circuit for the switch R1 extends from the previously energized conductor 41 through conductor 47, an interlock 48, on the switch LS, conductor 49, an interlock 51 on the switch R7, conductors 52 and 53, the closing coil 54 on the switch R1, conductor 55, and the contact members 56 of the limit relay LR to the negative conductor 46. The energizing circuit for the actuating coil of the switch M extends from the previously energized conductor 43 through the actuating coil 57 and conductors 58 and 45 to the negative conductor 46.

The closing of the switches LS, R1 and M connects the motor 10 to the power conductors through a circuit which may be traced from the power conductor 13 through the current collecting device 15, conductor 61, the switch R1, the resistors 17 to 21, inclusive, the armature winding 11, the current coil 26 of the relay LR, the switch M, conductors 62, the field winding 12, conductor 63, the switch LS and the current collecting device 16 to the negative conductor 14. In this manner, the motor 10 is energized to propel the vehicle, since the switch R1 is held closed by a holding coil 64 which is energized by the closing of an interlock 65 on the switch R1. The energizing circuit for the holding coil 64 may be traced from the previously energized conductor 53 through the interlock 65, a conductor 66, the coil 64 and a conductor 67 to the negative conductor 46.

Following the closing of the switch R1, the switch R2 is closed to shunt the resistor 17 from the motor circuit when the motor current has dropped to a value which permits the contact members of the limit relay LR to close in a manner well known in the art. The energizing circuit for the closing coil of the switch R2 may be traced from the previously energized conductor 52 through an interlock 68 on the switch R1, conductors 69 and 71, contact fingers 72 and 73 bridged by segment 74 on the controller AC, conductor 75, the closing coil 76 of the switch R2, conductors 77 and 78, an interlock 79 on the switch FS, conductors 81 and 82, an interlock 83 on the switch M, conductors 84 and 85 and the contact members 56 of the relay LR to a negative conductor 46. An energizing circuit is established for a holding coil 86 on the switch R2 which may be traced from the previously energized conductor 75 through an interlock 87 on the switch R2, the holding coil 86 and conductor 88 to the negative conductor 46.

Following the closing of the switch R2, the switch R5 is closed to shunt the resistor 18 from the motor circuit. The energizing circuit for the closing coil of the switch R5 may be traced from a contact finger 91 on the controller AC through conductor 92, an interlock 93 on the switch R2, conductor 94, and the closing coil 95 to the conductor 77 and thence through the interlock 79 and the contact member 56 of the limit relay LR to the negative conductor 46, as previously described. A holding coil 96 on the switch R5 is energized at this time through a circuit which extends from the conductor 94 through an interlock 97 on the switch R5, the holding coil 96 and a conductor 98 to the negative conductor 46.

Likewise, the switch R6 is closed to shunt the resistor 19. The energizing circuit for the closing coil of the circuit R6 extends from the previously energized conductor 71 through an interlock 101 on the switch R5, conductor 102, the closing coil 103, conductor 77 and thence to the negative conductor 46 through the limit relay LR, as previously described. A holding coil 104 on the switch R6 is energized through a circuit which extends from the conductor 102 through an interlock 105, the holding coil 104 and conductor 106 to the negative conductor 46.

Following the closing of the switch R6, the switch R7 is closed to shunt the resistor 20 from the motor circuit. The energizing circuit for the closing coil of the switch R7 may be traced from the previously energized conductor 49 through contact fingers 107 and 108 bridged by segment 109 on the controller AC through conductors 111 and 112, an interlock 113 on the switch R6, conductor 114, the closing coil 115 of the switch R7 to the conductor 77 and thence to the negative conductor 46 through the limit relay LR, as previously described. A holding coil 116 on the switch R7 is energized through a circuit which extends from the conductor 111 through the coil 116, an interlock 117 on the switch R7 and conductor 118 to the negative conductor 46.

The closing of the switch R7 opens the interlock 51 carried by this switch, thereby interrupting the circuit for the holding coils of the switches R1, R2, R5 and R6 which causes these switches to open at this time, as indicated in the sequence chart shown in Fig. 2.

Following the closing of the switch R7, and the opening of the switch R2, the switch R8 is closed to reconnect the resistors 17, 18, 19 and 20 in the motor circuit in parallel circuit relation with the resistor 21. The energizing circuit for the closing coil of the switch R8 may be traced from a contact finger 121 on the controller AC through conductor 122, an interlock 123 on the switch R7, conductor 124, the closing coil 125, conductor 126, and an interlock 127 on the switch R2 to the conductor 77 and thence to the negative conductor 46 through the limit relay LR, as previously described.

The motor circuit may now be traced from the positive conductor 13 through the current collector 15, conductors 31 and 128, the switch R7 and the resistor 21 to the armature winding 11 of the motor. A parallel circuit exists from the switch R7 through resistors 20, 19, 18 and 17, a conductor 129 and the switch R8 to the armature winding 11 of the motor. In this manner, a portion of the resistors are reconnected in the motor circuit to provide an additional number of accelerating steps without increasing the number of resistors and resistor shunting switches required. The switch R8 is held closed by the energization of its holding coil 131 through a circuit which extends from the conductor 122 through the holding coil 131, the interlock 117 on the switch R7, and the conductor 118 to the negative conductor 46.

Following the closing of the switch R8, the switch R2 is reclosed to shunt the resistor 17 from the motor circuit. At this time the energizing circuit for the closing coil of the switch R2 extends from the previously energized conductor 49 through an interlock 132 on the switch R8 and conductor 133 to the conductor 69 and thence to the closing coil of the switch R2 through a circuit previously traced.

Following the closing of the switch R2, the switches R5 and R6 are closed in the manner hereinbefore described to shunt the resistors 18 and 19 from the motor circuit. The reclosing of the switch R6 establishes an energizing circuit for the closing coil of the switch R1 to reclose this switch, thereby shunting the remaining resistors 20 and 21 from the motor circuit and connecting the motor 10 directly to the power source. The energizing circuit for the closing coil 54 of the switch R1 extends from the previously energized conductor 133 through an interlock 134 on the switch R6, the conductors 52 and 53, and thence through the coil 54, through a circuit previously traced.

Following the reclosing of the switch R1, the field shunting switch F1 is closed to establish a shunt circuit for the field winding 12 through the reactor 24 and the resistor 25, thereby increasing the speed of the motor in a manner well known in the art. The energizing circuit for the closing coil of the switch F1 may be traced from a contact finger 135 on the controller AC through conductor 136, an interlock 137, on the switch R8, conductor 138, an interlock 139 on the switch R1, conductor 141, the closing coil 142 of the switch F1 and conductor 143 to the conductor 78 and thence through the interlock 79 of a switch F2 and the contact members 56 of the relay LR to the negative conductor 46. The holding coil on the switch F1 is energized at this time through a circuit which extends from the conductor 141 through an interlock 144, conductor 145, the holding coil 146 and conductor 147 to the negative conductor 46.

Following the closing of the switch F1, the switch F2 is closed to shunt the resistor 25 from the field shunting circuit, thereby further decreasing the field current and increasing the speed of the motor. The energizing circuit for the closing coil of the switch F2 may be traced from the previously energized conductor 43 through conductor 148, an interlock 149, on the switch F1 and a closing coil 151 of the switch F2 to the conductor 143 and thence to the negative conductor 46 through the circuit previously traced. The holding coil of the switch F2 is energized through a circuit which extends from the interlock 149 on the switch F1 through an interlock 152 on the switch F2, conductor 153, the holding coil 154, and conductor 147 to the negative conductor 46. In this manner, the motor may be accelerated to its maximum speed.

If it is desired to retard the movement of the vehicle by dynamic braking, the controller BC is actuated to either position 1 or 2, depending upon the rate of braking desired, to establish dynamic braking connections for the motor 10. It will be noted that the accelerating controller AC may be left in the position to which it was moved during acceleration or in any one of the intermediate accelerating positions when the braking connections are established. In this manner, both controllers are utilized during dynamic braking and they cooperate in producing the desired braking effect. If the accelerating controller is left in the fifth or last position, the resistor shunting switches are automatically controlled by the limit relay LR throughout the entire braking range. It is necessary that the accelerating controller AC be in one of the operating positions in order that the braking connections will be established.

However, when the braking controller is moved from the "off" position, the interlocking circuit through the segment 39 is interrupted, thereby deenergizing the switches LS, M and the resistor shunting switches R1, R2, R5, R6, R7 and R8, as well as the field shunting switches F1 and F2, thereby disconnecting the motor from the power source and permitting the dynamic braking connections to be established by the closing of the switches B1, B2, B3, R1 and F1, as indicated in the sequence chart shown in Fig. 3. The energizing circuit for the actuating coil of the switch B1 may be traced from the contact finger 34 which engages the segment 35 of the controller AC through conductors 36 and 155, contact fingers 156 and 157 bridged by a segment 158 on the controller BC, conductor 159, an interlock 161 on the switch LS, conductor 162 and the actuating coil 163 of the switch B1 to the negative conductor 46. The energizing circuit for the switch B2 extends from the previously energized conductor 162 through the actuating coil 164 of the switch B2 to the negative conductor 46. Likewise, the energizing circuit for the actuating coil of the switch B3 extends from the conductor 162 through the coil 165 of the switch B3, conductor 166, contact members 167 of the relay RC and conductor 168 to the negative conductor 46.

Following the closing of the switch B2, the switch R1 is closed to complete the braking circuit through the resistors 17 to 21, inclusive. The energizing circuit for the actuating coil of the switch R1 extends from the conductor 155 through an interlock 171 on the switch B2 to the conductor 49 and thence through the closing coil 54 of the switch R1 to the negative conductor 46 through a circuit previously traced.

At this time the switch F1 is also closed to establish a shunt circuit for the field winding 12 of the motor 10 during the initial stages of dynamic braking operation, thereby reducing the motor excitation and preventing an excessive voltage and current from being generated while the vehicle is running at high speeds. The energizing circuit for the closing coil of the switch F1 extends from a contact finger 172 on the controller BC through conductor 173, through either an interlock 174 on the switch R8 or an interlock 175 on the switch R2 and conductor 141 to the closing coil 142 of the switch F1 and thence to the negative conductor 46 through a circuit previously traced.

As stated hereinbefore, the closing of the switches B1, B2 and R1 establish the dynamic braking connection for the motor 10. The dynamic braking circuit may be traced from one terminal in the armature winding 11 through the resistors 21, 20, 19, 18 and 17, the switch R1, conductors 61 and 31, the switch B, the resistor 22, conductor 62, the field winding 12, conductor 176, the switch B2 and a portion of the current coil 26 of the relay LR to the other terminal of the armature winding 11. In this manner the current generated in the armature winding of the motor is permitted to flow in the reverse direction from that during the motoring operation, but flows through the field winding 12 in the same direction, thereby causing the motor to function as a generator driven by the momentum of the vehicle.

In order to insure that the motor voltage will build up quickly and in the proper direction, the field winding 12 is excited from the power conductors when the dynamic braking connections are first established. The circuit through the field winding 12 is established by the closing of the switch B3 and may be traced from the power conductor 13 through the current collector 15, conductor 31, the switch B1, the resistor 22, conductor 62, the field winding 12, conductor 63, the switch B3, the resistor 23, conductor 46 and the current collector 16 to the negative conductor 14.

It will be noted that the energizing circuit for the actuating coil of the switch B3 is through the contact members 167 of the relay RC which are closed when the relay is in the deenergized position. As previously explained, the actuating coil of the relay RC is connected across the motor 10 during dynamic braking. Therefore, the contact members 167 are opened to deenergize the switch B3 when a predetermined voltage is generated by the motor, thereby removing the separate excitation from the field winding 12, since it is not required after the motor voltage has built up and the field winding is excited by the circulating current. The energizing circuit for the actuating coil of the relay RC may be traced from one terminal of the armature winding 11 through conductor 177, an interlock 178 on the switch B2 which is closed at this time, conductor 179, the actuating coil 181, conductor 182, the switch B2, and a portion of the current coil 26 of the relay LR to the other terminal of the armature winding 11.

As explained hereinbefore, the operation of the resistor shunting switches is prevented by the relay RC until a predetermined voltage is generated by the motor, thereby insuring that the proper amount of resistance is connected in the motor circuit when the dynamic braking current starts circulating. The sequential operation of the resistor shunting switches is automatically controlled by the limit relay LR during dynamic braking in the same manner as during acceleration. However, it is impossible for the sequential operation to start until the relay RC has closed its contact members 183 which are connected parallel to the interlock 83 on the switch M which is open at this time. Thus, when the contact members 183 are closed, the energizing circuit for the closing coil of the switch R2 is established to the contact members 56 of the limit relay LR and thence to the negative conductor 46 as explained hereinbefore, thereby permitting the switch R2 to close, as previously described. Following the closing of the switch R2, the switches R5, R6, R7 and R8 are closed in the same manner as during acceleration, and as indicated in the sequence chart shown in Fig. 3.

As explained hereinbefore, only a portion of the current coil 26 on the limit relay LR is utilized during dynamic braking and the potential coil 27 is connected across the motor, thereby making the relay LR responsive to both the motor current and the motor voltage. The energizing circuit for the potential coil 27 may be traced from one terminal of the armature winding 11 through conductor 177, the interlock 178 on the switch B2, the potential coil 27, a resistor 184, conductor 62, winding 12, conductor 176, switch B2 and a portion of the current coil 26 to the other terminal of the winding 11. In this manner, the relay LR is jointly responsive to the motor current and the motor voltage, thereby so controlling the operation of the resistor shunting switches that excessive current is prevented from circulating through the field winding 12 of the motor, thereby reducing the excitation of the motor and preventing an excessive voltage from being generated at high speeds.

From the foregoing description, it is apparent that I have provided a control system which is suitable for controlling the operation of electrically propelled vehicles, particularly trolley buses, since the amount of equipment required for dynamic braking has been materially reduced, thereby making it possible to install the equipment in practically the same space as was previously required for equipments without dynamic braking. Furthermore, relatively smooth operation of the vehicle is secured since a large number of accelerating and dynamic braking steps are provided. Also, excessive voltage of the motor during dynamic braking at high speeds is prevented and the quick response of the braking effect is assured.

I do not desire to be restricted to the particular form or arrangement of parts herein shown and described, since it is evident that they may be changed and modified without departing from the spirit and scope of my invention as defined in the appended claims.

I claim as my invention:

1. In a motor control system, in combination, a motor having an armature winding and a series field winding, a power conductor, switching means for connecting the motor to the power conductor, an accelerating controller operable to a plurality of operating positions for controlling the operation of said switching means to accelerate the motor, additional switching means for establishing dynamic braking connections for the motor, and a braking controller operable while said accelerating controller is in one of its operating positions to control the operation of said additional switching means during dynamic braking.

2. In a motor control system, in combination, a motor having an armature winding and a series field winding, a power conductor, switching means for connecting the motor to the power conductor, an accelerating controller for controlling the operation of said switching means to accelerate the motor, additional switching means for establishing dynamic braking connections for the motor, a braking controller cooperating with said accelerating controller to control the operation of said additional switching means during dynamic braking, a plurality of resistors for controlling the motor current during both acceleration and dynamic braking, and a plurality of switches for shunting said resistors in sequential relation, said accelerating controller controlling the operation of said switches during both acceleration and braking.

3. In a motor control system, in combination, a motor having an armature winding and a series field winding, a power conductor, switching means for connecting the motor to the power conductor, an accelerating controller operable to an operating position for controlling the operation of said switching means to accelerate the motor, additional switching means for establishing dynamic braking connections for the motor, a braking controller operable to an operating position for controlling the operation of said additional switching means, and interlocking means on said controllers requiring the operation of only one controller to an operating position during acceleration and of both controllers to operating positions during dynamic braking.

4. In a motor control system, in combination, a motor having an armature winding and a series field winding, a power conductor, switching means for connecting the motor to the power conductor, an accelerating controller for controlling the operation of said switching means to accelerate the motor, additional switching means for establishing dynamic braking connections for the motor, a braking controller for controlling the operation of said additional switching means, interlocking means on said controllers requiring the operation of only one controller during acceleration and both controllers during dynamic braking, a plurality of resistors for controlling the motor current during both acceleration and dynamic braking, and a plurality of switches for shunting said resistors in sequential relation, said accelerating controller controlling the operation of said switches during both acceleration and braking.

5. In a motor control system, in combination, a motor having an armature winding and a series field winding, a power conductor, means for establishing dynamic braking connections for the motor, and means connected across said armature winding to be directly responsive to the motor voltage for controlling the energization of the field winding from the power conductor during dynamic braking.

6. In a motor control system, in combination, a motor having an armature winding and a series field winding, a power conductor, means for establishing dynamic braking connections for the motor, means for energizing the field winding from the power conductor when the dynamic braking connections are established, and means connected across said armature winding to be directly responsive to the motor voltage for disconnecting the field winding from the power conductor when a predetermined motor voltage is attained.

7. In a motor control system, in combination, a motor having an armature winding and a series field winding, a power conductor, switching means for establishing dynamic braking connections for the motor, additional switching means for connecting the filed winding of the motor to the power conductor when the dynamic braking connections are established, and means connected across said armature winding to be directly responsive to the motor voltage for controlling the operation of said additional switching means.

8. In a motor control system, in combination, a motor having an armature winding and a series field winding, a power conductor, switching means for establishing dynamic braking connections for the motor, additional switching means for connecting the field winding of the motor to the power conductor when the dynamic braking connections are established, relay means connected across said armature winding to be directly responsive to the motor voltage for controlling the operation of said additional switching means, and means actuated by the switching means for establishing dynamic braking for controlling the energization of said relay means.

9. In a motor control system, in combination, a motor having an armature winding and a series field winding, a power conductor, switching means for establishing dynamic braking connections for the motor, a plurality of resistors for controlling the motor current during dynamic braking, a plurality of switches for shunting said resistors in sequential relation, means for energizing the field winding from the power conductor when the dynamic braking connections are established, and means responsive to the motor voltage for controlling the operation of the resistor shunting switches and the means for energizing the field winding from the power conductor.

10. In a motor control system, in combination, a motor having an armature winding and a series field winding, a power conductor, switching means for establishing dynamic braking connections for the motor, additional switching means for connecting the field winding to the power conductor when the dynamic braking connections are established, a plurality of resistors for controlling the motor current during dynamic braking, a plurality of switches for shunting said resistors in sequential relation, relay means responsive to the motor voltage for controlling the operation of said resistor shunting switches and said additional switching means, and means actuated by the switching means for establishing dynamic braking connections for controlling the energization of said relay means.

11. In a motor control system, in combination, a motor having an armature winding and a series field winding, switching means for establishing dynamic braking connections for the motor, a plurality of resistors for controlling the motor current during dynamic braking, a plurality of switches for shunting said resistors in sequential relation, and relay means jointly responsive to the motor armature current and the motor voltage for controlling the sequential operation of said switches during dynamic braking.

12. In a motor control system, in combination, a motor having an armature winding and a series field winding, switching means for establishing dynamic braking connections for the motor, a plurality of resistors for controlling the motor current during dynamic braking, a plurality of switches for shunting said resistors in sequential relation, means responsive to the voltage of the motor for controlling the initial operation of said switches, and relay means jointly responsive to the motor armature current and the motor voltage for controlling the sequential operation of said switches during dynamic braking.

13. In a motor control system, in combination, a motor having an armature winding and a series field winding, switching means for establishing dynamic braking connections for the motor, a plurality of resistors for controlling the motor current during dynamic braking, a plurality of switches for shunting said resistors in sequential relation, and a relay having a current element responsive to the motor armature current and a potential element responsive to the motor voltage for controlling the sequential operation of said switches during dynamic braking.

14. In a motor control system, in combination, a motor having an armature winding and a series field winding, switching means for establishing dynamic braking connections for the motor, a plurality of resistors for controlling the motor current during dynamic braking, a plurality of switches for shunting said resistors in sequential relation, a relay having a current element responsive to the motor armature current and a potential element responsive to the motor voltage for controlling the sequential operation of said switches during dynamic braking, and means actuated by said switching means for controlling the energization of said voltage element.

15. In a motor control system, in combination, a motor having an armature winding and a series field winding, switching means for establishing dynamic braking connections for the motor, a plurality of resistors for controlling the motor current during dynamic braking, a plurality of switches for shunting said resistors in sequential relation, and a relay having a current element responsive to the motor armature current and a potential element responsive to the motor voltage for controlling the sequential operation of said switches during dynamic braking, said switching means being disposed to make a portion of the current element of the relay ineffective during dynamic braking.

BASCUM O. AUSTIN.